United States Patent [19]

Yoshikawa et al.

[11] 4,043,976
[45] Aug. 23, 1977

[54] STABILIZED OLEFIN POLYMER COMPOSITION

[75] Inventors: Toshio Yoshikawa; Nagayoshi Sakamoto; Masayuki Kurita; Shunji Oh-e; Lomitado Nagamori, all of Ichihara, Japan

[73] Assignee: UBE Industries, Ltd., Ube, Japan

[21] Appl. No.: 723,141

[22] Filed: Sept. 14, 1976

[30] Foreign Application Priority Data

Mar. 30, 1976  Japan .................................. 51-34208

[51] Int. Cl.$^2$ ............................................. C08K 5/25
[52] U.S. Cl. ..................... 260/45.85 N; 260/45.9 NC; 260/471 R
[58] Field of Search ................ 260/45.85 N, 45.9 NC, 260/471 R

[56] References Cited

U.S. PATENT DOCUMENTS

| 3,772,245 | 11/1973 | Dexter | 260/45.9 NC |
| 3,772,722 | 11/1973 | Dexter | 260/45.9 NC |
| 3,806,358 | 4/1974 | Glander et al. | 260/45.9 NC |
| 3,884,874 | 5/1975 | Rosenberger et al. | 260/45.85 B |

Primary Examiner—V. P. Hoke
Attorney, Agent, or Firm—Flynn & Frishauf

[57] ABSTRACT

A stabilized olefin polymer composition having resistance against deterioration caused by contact with such heavy metals as copper which comprises 100 parts by weight of an olefin polymer and from 0.001 to 5 parts by weight of an N,N'-dibenzoylhydrazine derivative is disclosed.

9 Claims, No Drawings

STABILIZED OLEFIN POLYMER COMPOSITION

This invention relates to an olefin polymer composition having resistance against deterioration caused by contact with heavy metals.

Heretofore, such olefin polymers as polyethylene, polypropylene, and polybutene have been employed over a wide range of uses owing to their excellent physical or chemical characteristics. However, as is commonly known, if an olefin polymer is employed with no additives, it will deteriorate under the infuluence of heat, light or oxygen during processing or use. In order to prevent such deterioration, several kinds of anti-oxidizing agents have been studied and employed.

Yet, where olefin polymers cannot be kept from contact with such heavy metals as copper, iron, and nickel, for instance, when covering copper wire with olefin polymers, plating olefin polymers with heavy metals, or coloring olefin polymers by pigments containing heavy metals, the use of the aforementioned conventional anti-oxidizing agents can hardly bring about resistance against deterioration caused by contact with heavy metals.

Further, if liquid amorphous olefin polymers may possibly come into contact with copper, for instance, if a liquid amorphous olefin polymer is employed as an insulating oil for a cable, resistance against deterioration caused by contact with copper is required. Yet, the mere use of the aforementioned conventional anti-oxidizing agents, cannot meet the abovementioned requirement.

For the above reasons, a number of compounds have been considered for use as the anti-deteriorating agents for imparting olefin polymers resistance against deterioration caused by contact with heavy metals. Such compounds are: N,N-dibenzoylhydrazine, N-benzoyl-N'-salicyloylhydrazine, N,N'-dibutyrylhydrazine, N,N'-distearoylhydrazine, N,N'-bis[β-(3,5-di-tert-butyl-4-hyrdoxyphenyl)propionyl]hydrazine, N,N'-bis-salicyloylhydrazine, oxalobis(benzyldenehydrazide), N-salicylidene-N'-salicyloylhydrazine, etc. Yet, these agents cannot be considered agents satisfying the requirement of providing an anti-deteriorating effect.

This invention provides an olefin polymer composition having resistance against deterioration caused by contact with heavy metals which comprises 100 parts by weight of an olefin polymer and from 0.001 to 5 parts by weight of a compound having the formula (I)

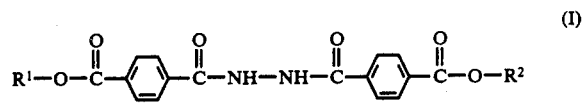

in which $R^1$ and $R^2$ may be the same or different, and each represents an alkyl group having 1 - 4 carbon atoms.

Olefin polymers of the composition of the present invention may be exemplified by amorphous or crystalline homopolymers or copolymers of such olefins as ethylene, propylene, butene-1, isobutene, pentene-1 and 4-methylpentene-1; copolymers of these olefins and alkyl esters of unsaturated carboxylic acids, e.g., methyl acrylate, ethyl acrylate, methyl methacrylate and ethyl methacrylate; copolymers of these olefins and such vinyl esters of saturated carboxylic acids as vinyl acetate; mixtures of these polymers; liquid amorphous polypropylene; and liquid amorphous polybutene.

A compound of the formula (I), which acts as an anti-deteriorating agent in the composition, can be easily prepared, for instance, by the following reactions.

A. Compounds of the formula (I) in which $R^1$ is different from $R^2$.

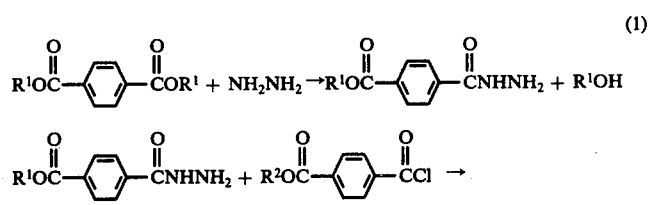

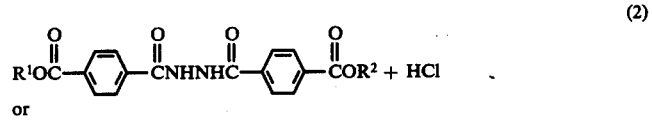

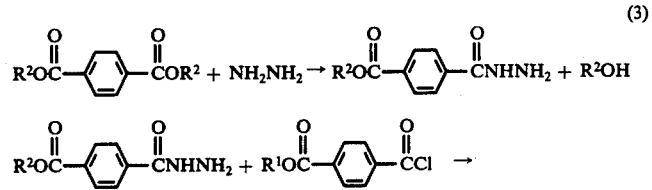

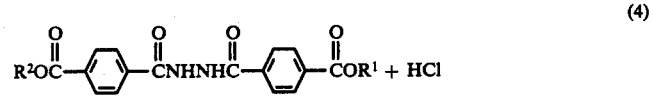

B. Compounds of the formula (I) in which $R^1$ and $R^2$ are the same.

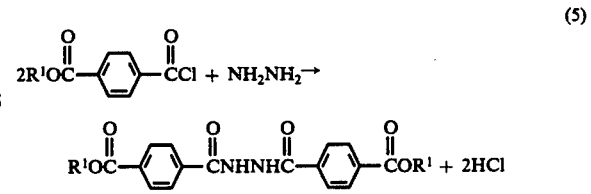

-continued

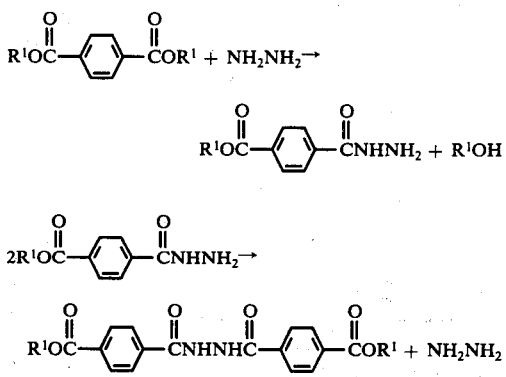

In the above-illustrated reactions, the hydrazine can be likewise conveniently employed in the form of hydrazine hydrate, hydrazine sulfate, hydrazine hydrochloride or one of other hydrazine adducts. When hydrazine sulfate or hydrazine hydrochloride is employed, however, it is required that such an alkaline compound as sodium hydroxide, potassium hydroxide, sodium carbonate, potassium carbonate, sodium hydrogencarbonate or potassium hydrogencarbonate is incorporated into the reaction mixture to produce free hydrazine.

The reactions of the above-mentioned (1), (3) and (6) readily proceed in the presence or absence of such a lower alcohol as methyl alcohol or ethyl alcohol when the reaction mixture is kept at a temperature of above 20° C. The reactions of the above-mentioned (2), (4) and (5) readily proceed in the presence or absence of such a solvent as N-dimethylacetamide, benzene, toluene or tetrahydrofuran when the reaction mixture is kept at a temperature of above 20° C. The reaction of the above-mentioned (7) proceeds in the presence or absence of such a solvent as N-dimethylacetamide, benzene, toluene, xylene or tetrahydrofuran when the reaction is kept at a temperature of above 100° C, preferably above 150° C.

The compounds of the formula (I) produced in the reactions are isolated from the reaction mixture after the reaction is completed. Examples of the procedures are described in the following. After completion of the reaction, the rection mixture is poured into a large amount of water, and the produced precipitate is collected by filtration. The precipitate is then washed with water or an aqueous solution containing the above-mentioned alkaline compounds and recrystallized from a recrystallization solvent such as acetic acid, methanol, ethanol, n-propanol and n-butanol.

Compounds preferably used in the composition of the present invention may be exemplified as follows: N,N'-bis(p-methoxy carbonylbenzoyl)hydrazine, N-(p-methoxycarbonylbenzoyl)-N'-(p-ethoxycarbonylbenzoyl)hydrazine, N-(p-methoxycarbonylbenzoyl)-N'-(p-n-propoxy carbonylbenzoyl)hydrazine, N-(p-methoxycarbonylbenzoyl)-N'-(p-isoproxycarbonylbenzoyl)-hydrazine, N-(p-methoxycarbonylbenzoyl)-N'-(p-n-butoxycarbonylbenzoyl)hydrazine, N-(p-methoxycarbonylbenzoyl)-N'-(p-isobutoxycarbonylbenzoyl)hydraxine, N,N'-bis(p-ethoxycarbonylbenzoyl)hydrazine, N-(p-ethoxycarbonylbenzoyl)-N'-(p-n-propoxycarbonylbenzoyl)hydrazine, N-(p-ethoxycarbonylbenzoyl)-N'-(isopropoxycarbonylbenzoyl)hydrazine, N-(p-ethoxycarbonylbenzoyl)-N'-(p-n-butoxycarbonylbenzoyl)hydrazine, N-(p-ethoxycarbonylbenzoyl)-N'-(p-isobutoxycarbonylbenzoyl)-hydrazine, N,N'-bis(p-n-propoxycarbonylbenzoyl)hydrazine, N-(p-n-propoxycarbonylbenzoyl)-N'-(p-isopropoxycarbonylbenzoyl)-hydrazine, N-(p-n-propoxycarbonylbenzoyl)-N'-(p-n-butoxycarbonylbenzoyl)hydrazine, N-(p-n-propoxycarbonylbenzoyl)-N'-(p-isobutoxycarbonylbenzoyl)hydrazine, N,N'-bis(p-isopropoxycarbonylbenzoyl)hydrazine, N-(p-isopropoxycarbonylbenzoyl)-N'-(p-isobutoxycarbonylbenzoyl)hydrazine, N,N'-bis(p-n-butoxycarbonylbenzoyl)hydrazine, and N,N'-bis(p-isobutoxycarbonylbenzoyl)hydrazine.

In the composition of the present invention, the amount of the anti-deteriorating agent of the formula (I) is from 0.001 to 5 parts by weight, preferably from 0.01 to 3 parts by weight per 100 parts by weight of olefin polymers. An amount less than the above-mentioned 0.001 part by weight cannot bring about a sufficient anti-deteriorating effect, and an amount of more than 5 parts by weight cannot provide any further anti-deteriorating effect.

Any process suitable for preparation of a homogeneous composition may be adopted for mixing or compounding the aforesaid anti-deteriorating agent with the olefin polymer, for example, dissolving or dispersing the anti-deteriorating agent in a low-boiling solvent, mixing the solution with an olefin polymer and removing the solvent by evaporation; heating an olefin polymer above its melting point on a surface of a heated roller and then mixing the anti-deteriorating agent therewith; or mixing an olefin polymer with the anti-deteriorating agent by means of a conventional mixer.

In addition, the anti-deteriorating agent of the formula (I) used in the present invention may be employed together with stabilizing agents, dispersing agents, plasticizers, antistatic agents, fillers, pigments and/or other conventional additives.

The stabilizing agents may be exemplified by phenol-type compounds, for instance, 2,6-di-tert-butyl-p-cresol, 2,6-di-tert-butylphenol, 4,4'-methylenebis(2,6-di-tert-butylphenol), 4,4'-methylenebis(3-methyl-6-tert-butylphenol), 4,4'-thiobis(2,6-di-tert-butylphenol), 4,4'-thiobis(2-methyl-6-tert-butylphenol), 6-(4-hydroxy-3,5-di-tert-butylanilino)-2,4-bis(n-octylthio)-1,3,5-triazine, tetrakis[methylene 3-(3,5-di-tert-butyl-4-hydroxyphenyl)-propionate]-methane, octadecyl 3-(3,5-di-tert-butyl-4-hydroxyphenyl)-propionate, 1,1,3-tris(2-methyl-4-hydroxy-5-tert-butylphenyl)-butane, 2,2'-methylenebis(4-methyl-6-tert-butylphenol), 4,4'-butylidenebis(3-methyl-6-tert-butylphenol), 2,2'-methylenebis(4-ethyl-6-tert-butylphenol), and 1,3,5-trimethyl-2,4,6-tris(3,5-di-tert-butyl-4-hydroxybenzyl)-benzene; dialkyl 3,3'-thiodipropionates, for instance, didodecyl 3,3'-thiodipropionate and dioctadecyl 3,3'-thiodipropionate; and organic phosphorus compounds, for instance, trilauryl phosphite, trilauryl trithiophosphite and tris(nonylphenyl) phosphite.

Synthesis examples of the compound of the formula (I) which acts as the anti-deteriorating agent in the composition of the present invention will be illustrated below.

SYNTHESIS EXAMPLE 1 SYNTHESIS OF N,N'-BIS(P-METHOXYCARBONYLBENZOYL)-HYDRAZINE

In a flask equipped with a reflux condenser were placed 20.0 g of p-methoxycarbonylbenzoic acid and 300 g of thionyl chloride, and the reaction was carried out under reflux. After evolvement of hydrogen chloride and sulfur dioxide ceased, the residual thionyl chloride was distilled off under reduced pressure. The remaining p-methoxy carbonylbenzoyl chloride was dissolved in 100 ml of tetrahydrofuran, and this solution was slowly added dropwise with stirring to a solution of 3 g of 85% hydrazine hdyrate and 8.5 g of sodium hydrogencarbonate in 200 ml of water maintained at 20° - 30° C. After completion of the addition, the mixture was stirred at 20° - 30° C for 6 hours. The produced precipitate was collected by filtration and washed with water. The so obtained product was recrystallized twice from methanol (first grade, prepared and sold by Wako Junyaku Kabushiki Kaisha, Japan) and dried under reduced pressure to yield 11 g of N,N'-bis(p-methoxycarbonylbenzoyl)hydrazine as white crystals, m.p. 287° - 290° C. Analysis: Calculated for $C_{18}H_{16}N_2O_6$: C, 60.67%; H, 4.49%; N, 7.87%, Found: C, 60.69%; H, 4.41%; N, 7.59%.

SYNTHESIS EXAMPLE 2 SYNTHESIS OF N,N'-BIS(P-ETHOXYCARBONYLBENZOYL)HYDRAZINE

In a flask equipped with a reflux condenser were placed 20.0 g of p-ethoxycarbonylbenzoic acid and 300 g of thionyl chloride, and the reaction was carried out under reflux. After evolvement of hydrogen chloride and sulfur dioxide ceased, the residual thionyl chloride was distilled off under reduced pressure. The remaining p-ethoxycarbonylbenzoyl chloride was dissolved in 100 ml of tetrahydrofuran, and this solution was slowly added dropwise with stirring to a solution of 3.0 g of 85% hydrazine hydrate and 8.7 g of sodium hydrogencarbonate in 200 ml of water maintained at 20° - 30° C. After completion of the addition, the mixture was stirred at 20° - 30° C for 3 hours. The produced precipitate was collected by filtration and washed with water. The so obtained product was recrystallized twice from ethanol (first grade, prepared and sold by Wako Junyaku Kabushiki Kaisha, Japan) an dried under reduced pressure to yield 13.0 g of N,N'-bis(p-ethoxycarbonylbenzoyl)hydrazine as white crystals, m.p. 191°-195° C. Analysis: Calculated for $C_{20}H_{20}N_2O_6$: C, 62.50%; H, 5.21%; N, 7.29%, Found: C, 62.43%; H, 5.21%; N, 7.38%.

SYNTHESIS EXAMPLE 3 N,N'-BIS(P-N-PROPOXYCARBONYLBENZOYL)-HYDRAZINE

In a flask equipped with a reflux condenser were placed 20.0 g of p-n-propoxycarbonylbenzoic acid and 300 g of thionyl chloride, and the reaction was carried out under reflux. After evolvement of hydrogen chloride and sulfur dioxide ceased, the residual thionyl chloride was distilled off under reduced pressure. The remaining p-n-propoxycarbonylbenzoyl chloride was dissolved in 100 ml of tetrahydrofuran, and this solution was slowly added dropwise with stirring to a solution of 2.8 g of 85% hydrazine hydrate and 8.0 g of sodium hydrogencarbonate in 200 ml of water maintained at 20° - 30° C. After completion of the addition, the mixture was stirred at 20° - 30° C for 10 hours. The produced precipitate was collected by filtration and washed with water. The so obtained product was recrystallized twice from n-propanol (first grade, prepared and sold by Wako Junyaku Kabushiki Kaisha, Japan) and dried under reduced pressure to yield 10.0 g of N,N'-bis(p-n-propoxycarbonylbenzoyl)hydrazine as white crystals, m.p. 173° - 175° C. Analysis: Calculated for $C_{22}H_{24}N_2O_6$: C, 64.08%; H, 5.83%; N, 6.80%, Found: C, 64.12%; H, 5.85%; N, 6.74%.

SYNTHESIS EXAMPLE 4 SYNTHESIS OF N,N'-BIS(P-N-BUTOXYCARBONYLBENZOYL)-HYDRAZINE

In a flask equipped with a reflux condenser were placed 25.0 g of p-n-butoxycarbonylbenzoic acid and 300 g of thionyl chloride, and the reaction was carried out under reflux. After evolvement of hydrogen chloride and sulfur dioxide ceased, the residual thionyl chloride was distilled off under reduced pressure. The remaining p-n-butoxycarbonylbenzoyl chloride was dissolved in 100 ml of tetrahydrofuran, and this solution was slowly added dropwise with stirring to a solution of 3.4 g of 85% hydrazine hydrate and 9.4 g of sodium hydrogencarbonate in 200 ml of water maintained at 20° - 30° C. After completion of the addition, the mixture was stirred at 20° - 30° C for 7 hours. The produced precipitate was collected by filtration and washed with water. The so obtained product was recrystallized twice from n-butanol(first grade, Wako Junyaku Kabushiki Kaisha, Japan) and dried under reduced pressure to yield 14.0 g of N,N'-bis(p-n-butoxycarbonylbenzoyl)hydrazine as white crystals, m.p. 166° - 168° C. Analysis: Calculated for $C_{24}H_{28}N_2O_6$: C, 65.45%; H, 6.36%; N, 6.36%, Found: C, 65.31%; H, 6.71%; N, 6.23%.

The following are examples and comparative examples. The term "part" means "part by weight", and "M.I." means "Melt Flow Index" which was determined in accordance with ASTMD 1238. The notations shown in the examples and comparative examples mean the following compounds.

A: N,N'-bis(p-methoxycarbonylbenzoyl)hydrazine
B: N,N'-bis(p-ethoxycarbonylbenzoyl)hydrazine
C: N,N'-bis(p-n-propoxycarbonylbenzoyl)hydrazine
D: N,N'-bis(p-n-butoxycarbonylbenzoyl)hydrazine
a: N,N'-dibenzoylhydrazine
b: N-benzoyl-N'-salicyloylhydrazine
c: N,N'-dibutyrylhydrazine
d: N,N'-distearoylhydrazine
e: N,N'-bis{β-(3,5-di-tert-butyl-4-hydroxyphenyl)propionyl}-hydrazine
f: N,N'-bissalicyloylhydrazine
g: N-salicyloyl-N'-stearoylhydrazine
h: N,N'-bis(p-methylbenzoyl)hydrazine
i: N,N'-bis(p-methoxybenzoyl)hydrazine
j: N,N'-bis(p-acetoxybenzoyl)hydrazine
k: oxalobis(benzylidenehydrazide)
l: N-salicylidene-N'-salicyloylhydrazine
m: N,N'-bis(p-carboxybenzoyl)hydrazine
n: N,N'-bis(o-carboxybenzoyl)hydrazine The compounds a - n are conventional anti-deteriorating agents.

EXAMPLES 1 - 4

One hundred parts of powdery isotactic polypropylene with no additives (M.I. = 5), 0.2 part of tetrakis [methylene 3-(3,5-di-tert-butyl-4-hyroxyphenyl)propionate]methane, 0.5 part of distearyl 3,3'-thiodipropionate, 1.0 part of 2,6-di-tert-butyl-p-cresol and 0.2 part of a compound set out in Table 1 were preliminarily mixed in a mixer. This mixture was placed in a Brabender plastograph adjusted to a rotation speed of 60 r.p.m. and a temperature of 190° C, and kneaded for 5 minutes. The resulting mixture was pressed at 190° C by the use of a spacer to form a film having thickness of 0.5 mm. Between a couple of the so obtained films was placed a copper net of 60 meshes, and this was then pressed at 190° C by the use of a spacer of thickness of 0.8 mm to obtain a copper net buried film. The so obtained film was cut into rectangular (50 mm × 30 mm) pieces which were in turn subjected to the test described below.

The test pieces were suspended in a Geer's oven under an aerial atmosphere at 150° C, and the period at the end of which the pieces deteriorated were determined. The results are set forth in Table 1.

Table 1

| Example No. | Compound added | Period up to deterioration (days) |
| --- | --- | --- |
| 1 | A | 85 |
| 2 | B | 72 |
| 3 | C | 65 |
| 4 | D | 59 |

COMPARATIVE EXAMPLES 1 - 15

The procedures of Examples 1 - 4 were repeated except that conventional anti-deteriorating agents $a - n$ were employed in place of the compounds A - D. In comparative example 1, no anti-deteriorating agent was added. The results are set forth in Table 2.

Table 2

| Comparative example No. | Anti-deteriorating agent | Period up to deterioration (days) |
| --- | --- | --- |
| 1 | — | 1 |
| 2 | a | 11 |
| 3 | b | 18 |
| 4 | c | 7 |
| 5 | d | 5 |
| 6 | e | 31 |
| 7 | f | 15 |
| 8 | g | 13 |
| 9 | h | 9 |
| 10 | i | 8 |
| 11 | j | 11 |
| 12 | k | 25 |
| 13 | l | 27 |
| 14 | m | 5 |
| 15 | n | 7 |

EXAMPLES 5 - 8

One hundred parts of pellets of high-density polyethylene with no additives (M.I. = 0.30) were placed in a Brabender plastograph adjusted to a rotation speed of 60 r.p.m. and a temperature of 190° C. Two minutes later, 0.15 part of tetrakis[methylene 3-(3,5-di-tert-butyl-4-hydroxyphenyl)propionate]methane and 0.2 part of a compound set out in Table 3 were added thereto, and the mixture was then kneaded for 6 minutes. This was pressed at 190° C by the use of a spacer to form a film having thickness of 0.5 mm. Between a couple of the so obtained films was placed a copper net of 60 meshes, and this was then pressed at 190° C by the use of a spacer of thickness of 0.8 mm to obtain a copper net buried film. The so obtained film was cut into rectangular (10 mm × 5 mm) pieces which were in turn subjected to the test described below.

The test pieces were examined by Oxygen Absorption Method. The pieces were heated to 170° C under an oxygenic atmosphere, and the relation between an amount of the absorbed oxygen and a period of time was checked. The period in minutes at the end of which the absorbed oxygen amounted to 5 ml (20° C at an atmospheric pressure) per one gram of the piece was determined. This period is called "Induction period", and the results are set forth in Table 3.

Table 3

| Example No. | Compound added | Induction period (minutes) |
| --- | --- | --- |
| 5 | A | 1880 |
| 6 | B | 1510 |
| 7 | C | 1450 |
| 8 | D | 1230 |

COMPARATIVE EXAMPLES 16 - 30

The procedures of Examples 5 - 8 were repeated except that conventional anti-deteriorating agents $a - n$ were employed in place of the compounds A - D. In Comparative example 16, no anti-deteriorating agent was added. The results are set forth in Table 4.

Table 4

| Comparative example No. | Anti-deteriorating agent | Induction period (minutes) |
| --- | --- | --- |
| 16 | — | 135 |
| 17 | a | 430 |
| 18 | b | 520 |
| 19 | c | 350 |
| 20 | d | 320 |
| 21 | e | 750 |
| 22 | f | 480 |
| 23 | g | 410 |
| 24 | h | 420 |
| 25 | i | 380 |
| 26 | j | 390 |
| 27 | k | 715 |
| 28 | l | 700 |
| 29 | m | 370 |
| 30 | n | 400 |

EXAMPLES 9 - 12

The procedures of Examples 5 - 8 were repeated except that the high-density polyethylene was replaced by a low-density polyethylene (M.I. = 0.25) and that the temperature of the kneading (the temperature of the Brabender plastograph) was changed into 140° C. The Induction periods are set forth in Table 5.

Table 5

| Example No. | Compound added | Induction period (minutes) |
| --- | --- | --- |
| 9 | A | 1710 |
| 10 | B | 1450 |
| 11 | C | 1300 |
| 12 | D | 1200 |

COMPARATIVE EXAMPLES 31 - 45

The procedures of Examples 9 - 12 were repeated except that conventional anti-deteriorating agents $a - n$ were employed in place of the compounds A - D. In Comparative example 31, no anti-deteriorating agent was added. The results are set forth in Table 6.

Table 6

| Example No. | Anti-deteriorating agent | Induction period (minutes) |
| --- | --- | --- |
| 31 | — | 90 |
| 32 | a | 350 |
| 33 | b | 420 |
| 34 | c | 210 |
| 35 | d | 180 |
| 35 | d | 180 |
| 36 | e | 480 |
| 37 | f | 350 |
| 38 | g | 300 |
| 39 | h | 250 |
| 40 | i | 310 |
| 41 | j | 290 |
| 42 | k | 430 |

Table 6-continued

| Example No. | Anti-deteriorating agent | Induction period (minutes) |
| --- | --- | --- |
| 43 | l | 420 |
| 44 | m | 240 |
| 45 | n | 290 |

EXAMPLES 13 - 16

One hundred parts of powdery isotactic polypropylene with no additives (M.I. = 5), 0.03 part of tetrakis[methylene 3-(3,5-di-tert-butyl-4-hydroxyphenyl)propionate]methane, 0.07 part of distearyl 3,3'-thiodipropionate, 0.1 part of 2,6-di-tert-butyl-p-cresol, 0.015 part of calcium stearate and 0.3 part of a compound set out in Table 7 were preliminarily mixed in a mixer. This mixture was placed in a Brabender plastograph adjusted to a rotation speed of 60 r.p.m. and a temperature of 190° C, and kneaded for 8 minutes. The resulting mixture was pressed at 190° C by the use of a spacer to form a film having thickness of 0.5 mm. Between a couple of the so obtained films was placed a copper net of 60 meshes, and this was then pressed at 190° C by use of a spacer of thickness of 0.8 mm to obtain a copper net buried film. The so obtained film was cut into rectangular (50 mm × 30 mm) which were in turn subjected to the test described below.

The test pieces were suspended in a Geer's oven under an aerial atmosphere at 150° C, and the period at the end of which the pieces deteriorated were determined. The results are set forth in Table 7.

Table 7

| Example No. | Compound added | Period up to deterioration (days) |
| --- | --- | --- |
| 13 | A | 64 |
| 14 | B | 47 |
| 15 | C | 49 |
| 16 | D | 46 |

COMPARATIVE EXAMPLES 46 - 53

The procedures of Examples 13 - 16 were repeated except that some conventional anti-deteriorating agents a - k were employed in place of the compounds A - D. In Comparative example 46 no anti-deteriorating agent was added. The results are set forth in Table 8.

Table 8

| Comparative example No. | Anti-deteriorating agent | Period up to deterioration (days) |
| --- | --- | --- |
| 46 | — | 3 |
| 47 | a | 10 |
| 48 | c | 9 |
| 49 | d | 3 |
| 50 | e | 38 |
| 51 | g | 10 |
| 52 | h | 10 |
| 53 | k | 34 |

What we claim is:

1. An olefin polymer composition which comprises 100 parts by weight of an olefin polymer and from 0.001 to 5 parts by weight of a compound having the formula

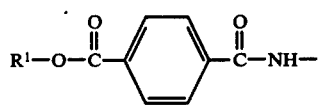
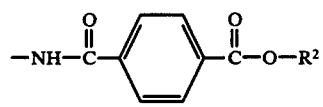

in which $R^1$ and $R^2$ are the same or different, and each represents an alkyl group having 1 - 4 carbon atoms.

2. A composition so claimed in claim 1 wherein the compound has the formula defined in claim 1 in which $R_1$ and $R_2$ are the same.

3. A composition as claimed in claim 1 wherein the compound is N,N'-bis(p-methoxycarbonyl)hydrazine.

4. A composition as claimed in claim 1 wherein the olefin polymer is an ethylene homopolymer, isotactic polypropylene or an ethylene - vinyl acetate copolymer.

5. A composition as claimed in claim 1 which comprises 100 parts by weight of an olefin polymer and from 0.01 to 3 parts by weight of the compound.

6. A composition as claimed in claim 1 which further comprises at least one stabilizing agent, dispersing agent, plasticizer, antistatic agent, filler or pigment.

7. A composition as claimed in claim 1 wherein the compound is N,N'-bis(p-ethoxycarbonylbenzoyl)hydrazine.

8. A composition as claimed in claim 1 wherein the compound is N,N'-bis(p-n-propoxycarbonylbenzoyl)hydrazine.

9. A composition as claimed in claim 1 wherein the compound is N,N'-bis(p-n-butoxycarbonylbenzoyl)hydrazine.

* * * * *

UNITED STATES PATENT AND TRADEMARK OFFICE
CERTIFICATE OF CORRECTION

PATENT NO. : 4,043,976
DATED : August 23, 1977
INVENTOR(S) : TOSHIO YOSHIKAWA et al It is certified that error appears in the above-identified patent and that said Letters Patent are hereby corrected as shown below:

Title page, at [75]: replace "Lomitado Nagamori" with --- Tomitada Nagamori ---.

Column 1, line 67: replace "oxalobis(benzyldenehydrazide)" with --- oxalobis(benzylidenehydrazide) ---.

Column 8, Table 6: delete "Example No. 35" (second occurrence).

Signed and Sealed this

Twenty-fourth Day of July 1979

[SEAL]

Attest:

LUTRELLE F. PARKER
Attesting Officer    Acting Commissioner of Patents and Trademarks